United States Patent [19]

Chen et al.

[11] 3,879,890

[45] Apr. 29, 1975

[54] ALGAL POLYSACCHARIDE PRODUCTION

[75] Inventors: Lawrence C. M. Chen, Spryfield, Nova Scotia; James S. Craigie, Halifax, Nova Scotia; Esther L. McCandless, Dundas, Ontario; Jack L. McLachlan, Halifax, Nova Scotia, all of Canada; Arthur C. Neish, deceased, late of Granville Ferry, Nova Scotia, Canada, by Dorothy A. Neish, executrix; Peter F. Shacklock, Sambro; John A. Walter, Halifax, Nova Scotia, both of Canada

[73] Assignee: Canadian Patents and Development Limited, Ontario, Canada

[22] Filed: Feb. 6, 1974

[21] Appl. No.: 440,247

[52] U.S. Cl. .............................. 47/1.4; 260/209 R
[51] Int. Cl. ............................................ A01g 7/00
[58] Field of Search ..................... 47/1.4; 260/209 R

[56] References Cited
UNITED STATES PATENTS

| | | | |
|---|---|---|---|
| 2,620,334 | 2/1952 | Nielsen et al. | 260/209 |
| 2,732,661 | 1/1956 | Spoehr et al. | 47/1.4 |
| 3,195,271 | 7/1965 | Golveke et al. | 47/1.4 |
| 3,439,449 | 4/1969 | Huff | 47/1.4 |

*Primary Examiner*—Robert E. Bagwill
*Attorney, Agent, or Firm*—Alan A. Thomson

[57] ABSTRACT

Selected polysaccharides are produced from algal plant tissue by (a) separating vegetative parts or spores into (i) gametophytes, or (ii) tetrasporophytes; (b) vegetatively propagating the separated plant material; (c) harvesting the resulting plant growth; and (d) recovering the desired polysaccharides from the harvested material. Different specific polysaccharides (e.g., kappa- or lambda-carrageenan) have been found to be produced by (i) or (ii) above. This method avoids difficult post-harvest separations and is amenable to controlled vegetative propagation of the separated plant material under optimum conditions.

12 Claims, No Drawings

ALGAL POLYSACCHARIDE PRODUCTION

This invention is directed to the production of polysaccharides from a selected alga such that distinct polysaccharides are produced rather than the usual mixtures. Marine algae such as Irish moss producing carrageenans are of particular interest.

At present the algae are harvested from natural sources without sorting the raw material with respect to chemical constituents. Harvesting using hand or crude methods from coastal waters and rocks is traditional and subject to the vagaries of natural supply and seasonal labor. The polysaccharides are extracted from the algae with hot aqueous solutions yielding a crude extract consisting of several polysaccharides in proportions which vary widely and unpredictably. Since these mixtures often contain undesired components it is usually necessary to carry out chemical separation or purification steps on the product.

Carrageenans, water-soluble polysaccharides of some commercial importance, occur in quantity in a number of rhodophycean algae, especially Irish moss and other members of the Gigartinaceae. A crude aqueous extract of the algae contains several carrageenans, principally kappa ( ) or lambda ($\lambda$) in varying proportions. The is traditionally defined as that fraction which is insoluble or forms a gel in the presence of a standard concentration of potassium ions, while the $\lambda$ remains in solution, e.g., Smith, Cook, and Neal, Arch. Biochem. Biophys. 53: 192–204. 1954. Due to the properties of the fractions and different industrial uses, this type of separation based on the solubilities is usually a commercial necessity, and is both cumbersome and costly. It should be noted that the preliminary studies of Chen et al. J. mar. biol. Ass. U.K. 53: 11–16. 1973, were interpreted in terms of the traditional definition of lambda and kappa carrageenan, whereas McCandless et al., Planta 112: 201–212. 1973, isolated and characterized the carrageenans from the various Chondrus plants. In the latter work, the term lambda carrageenan was defined as that polysaccharide fraction which most closely conforms to the definition of Dolan and Rees: Jour. Chem. Soc: 3534-3539. 1965. The total K$^+$-soluble polysaccharide component may include other carrageenans in addition to the $\lambda$ defined by Dolan and Rees. Wide fluctuations in the ratios of KCl-insoluble to KCl-soluble carrageenans have usually been attributed to such factors as seasonal changes, different habitats, or age of the plants.

The artificial culturing of certain algae have been carried out in the past with very limited success. U.S. Pat. No. 3,195,271 Golueke et al. July 20, 1965 describes growing a red alga *Porphyridium cruentum* in seawater and sewage and adding alcohol to coagulate a form of crude "carrageenan". Certain microscopic algae have also been cultivated in confined areas to obtain products other than carrageenans. Invariably the algae have been grown in their normal complete life cycle.

Recently the life cycle of marine algae such as *Chondrus crispus* has become more fully elaborated and understood, and the separation of plants or parts thereof on the basis of their stage in the life cycle may now be more easily and accurately made. Botanists will be able to make the required separation into male, female and tetrasporic plants. Details on the life history of *Chondrus crispus* have recently been published by Chen and McLachlan: Canadian Jour. Bot. 50: 1055–1060. 1972, and information therein will facilitate the separations for this species.

In accordance with this invention, we have now found that there is a significant difference in the polysaccharide components of algal plants at different stages of their life cycle. Thus male or female plants of these algae have been found to contain largely the insoluble or gelling form of polysaccharide (i.e. -carrageenan). Tetrasporic (asexual) plants were found to produce only the soluble, highly viscous form of polysaccharide, $\lambda$-carrageenan. It is evident then that by separating plants on this basis and separately propagating them, it is possible to obtain one form of polysaccharide in the almost complete absence of the other. Thus a post-harvest large scale separation procedure can be replaced by a pre-growth small-scale plant selection.

We have further found that the segregated plants can be vegetatively propagated and maintained at the selected stage of the life cycle.

The features of our invention include:

1. The selection of plant material suitable for the production of the polysaccharide type desired;
2. The vegetative propagation of the segregated plant material or clone thereof;
3. The establishment of conditions for the successful cultivation in free-floating suspension of plants which are normally benthonic; and
4. The elimination of costly precipitation, centrifugation or K$^+$-fractionation of the harvested and extracted polysaccharide material.

The method according to the invention for the production of specific algal polysaccharide from selected algal strains producing the desired polysaccharide comprises:

a. providing vegetative parts or spores separated into
  i. gametophytes, or
  ii. tetrasporophytes
(arising from either the tetrasporophytic or gametophytic stages of the plant life cycle),
b. vegetatively propagating the segregated plant material,
c. harvesting the plant growth, and
d. recovering the desired polysaccharides from the harvested plants.

The species currently of most interest are *Chondrus crispus* and *Gigartina stellata*, but other carrageenan-producing species may be used.

The vegetative propagation may be carried out in any enclosed area where non-segregated algal material is absent. Enclosed coastal areas may be established for this purpose. We have found tanks or lined dug-outs within easy pumping distance of the ocean to be quite satisfactory. Considerable work in vegetative propagation of *Chondrus crispus* under controlled conditions has been carried out by the Atlantic Regional Laboratory of the National Research Council of Canada, Halifax, Nova Scotia. Results indicate that tank culture of such algae is feasible. Results indicate that the seawater should be enriched with fixed-nitrogen-source materials such as ammonium or nitrate ions for reasonable growth rates and color retention. This nitrogen may be administered intermittently (e.g., twice a week to give a concentration of approximately 1 millimolar), or continuously to give an ambient concentration greater than about 5 micromolar. Ammonium nitrate, calcium nitrate and ammonium sulfate were about equally effective in promoting growth. The addition of carbon as $CO_2$ or $NaHCO_3$ stimulated growth in fertilized and in unfertilized seawater. Temperatures between 10°–22°C permit substantial growth of the alga, but 15°–20°C is preferred. Addition of phosphate ions appears beneficial in amounts of about one-tenth that of the nitrogen. Growth was affected by pH and was best in the range of pH 6.5 to 8.5. The growth medium tends to become alkaline and maintaining the pH with $CO_2$ additions was found beneficial to growth rate. A $CO_2$-maintained pH of about 7.8 was found most efficient.

It was found desirable to renew the seawater by continuous flushing to prevent a decrease of natural nutritive constituents or a build-up of undesired products or debris. Most beneficial was the replacement of the seawater over 12 to 24 hour intervals. A low turnover of seawater (twice a week) gave cloudy water and low growth rates. Supplemental illumination favored vegetative growth compared to the natural daylight cycle. Growth was not inhibited by the absence of a dark period. The density of plant material in the culture tanks is suitably within about 0.2 to 1.4 lbs./sq. ft. of surface area, preferably about 0.6 – 1.0. Depending on the amount of illumination, plant density and agitation, growth rates at depths of up to about 6 ft. would be acceptable.

Plants growing rapidly in N-enriched seawater were found to have a low content of total solids and carrageenans, and a high content of nitrogenous compounds compared to plants growing under similar conditions in unenriched seawater. However, this solids content is reversible and in unenriched seawater the plants with a high initial N-content quickly increase in carrageenan and total solids content and decrease in nitrogen compounds. This treatment with normal or N-depleted seawater thus becomes a desirable step before harvest. If suitable illumination is also present during this pre-harvest step, the plant solids will bleach to a pale or substantially colorless state which gives a desirable uncolored product. The duration of this pre-harvest step is suitably approximately 2 – 3 weeks.

This segregation and vegetative propagation technique permits the selection of starting plants or inoculum having the most vigorous growth characteristics. Studies at the Atlantic Regional Laboratory, N. R. C. on one plant which grew particularly well (designated T4) have shown that a clone propagated from this plant grew from 4.5 gm. to a total biomass of about three-fourths ton in about 28 months. Under constant conditions new growing tips were formed continually by dichotomous branching, and when this plant was divided, the individual pieces continued to grow well. This plant produced -carrageenan and appeared to be gametophytic.

Further experiments have shown that tetrasporic plants of *Chondrus crispus* increased in biomass three- to four-fold in 1 month.

The following Examples are illustrative. In some cases sporelings of known nuclear phases, obtained after 4 months of incubation under laboratory conditions, were transferred to our marine laboratory. Here they were incubated under reduced illumination (about 50% of the incident illumination in the greenhouse) in running seawater enriched with $NH_4NO_3$ and $(NH_4)_2HPO_4$. Plants from nature were taken at Cape d'Or, Cumberland Co., and Sandy Cove and Martinique Beach, Halifax Co., Nova Scotia. Specimens of *Gigartina stellata*, derived from carpospores, were obtained by laboratory culture under conditions as described for *Chondrus crispus*. Plants from nature were taken at Cape d'Or, Sandy Cove, Digby Co., and Sandy Cove, Halifax Co.

Before analysis, plants from nature were cleaned of all major epiphytic contaminants. The fresh weight was recorded after blotting with paper towelling, and the plants were dried for 24 h. in the laboratory at ambient temperature, then for 16 – 20 h. in a vacuum desiccator over $CaCl_2$, and finally powdered. The traditional - and λ-fractions were determined colorimetrically after extraction in aqueous sodium bicarbonate buffer and precipitation with cetyl pyridinium chloride. The precipitate was redissolved and analysed by the color reactions obtained with resorcinol-HCl and phenolsulphuric acid.

EXAMPLE 1

*Chondrus crispus* from Nature (Table 1)

These plants were obtained from two widely different habitats, one on the Atlantic coast (Sandy Cove and Martinique Beach) and the other on the Bay of Fundy (Cape d'Or). There was little variation in the total content of carrageenan among these specimens. A very marked difference in the proportions of - and λ-fractions was noted with the highest concentration of the former found in the female gametophytes from both shores. Tetrasporophytes from both areas contained proportionally much more λ-carrageenan. Unfortunately no male plants were located at Cape d'Or at this collection date.

EXAMPLE 2

*Chondrus crispus* from laboratory culture (Tables 2 and 3)

These results substantiate those obtained for plants from nature. In all cases the /λ ratio in tetrasporic plants was less than unity, and a much higher proportion of the -fraction was found in the gametophytes. Various conditions of light, temperature and reproductive maturity had little apparent effect on these ratios. This is especially evident from the results presented in Table 3 for tetrasporic plants.

EXAMPLE 3

*Chondrus crispus* from greenhouse culture (Table 4)

As before there was a marked difference in the proportion of the - and λ-carrageenan in gametophytic and tetrasporic plants. Also as noted previously, reproductive maturity had no apparent effect on the /λ ratio.

EXAMPLE 4

*Gigartina stellata* (Table 5)

In plants both from nature and culture, (all included here were non-tetrasporic or gametophytic) the -fraction exceeded that of the λ-fraction, and with a /λ ratio similar to that in gametophytic plants of *Chondrus crispus*. Variation in total carrageenan content in these plants was not marked, and similar to that found in *Chondrus crispus*.

The isolation and characterization of the carrageenans from tetrasporic and gametophytic *Chondrus* was achieved by McCandless et al. (1973) cited above. It was shown that the KCl-soluble carrageenans from these two types of plants were not identical, and that λ-carrageenan was produced only by the tetrasporic plants while -carrageenan was formed only by gametophytic plants (e.g. FIGS. 2a–e, and 3a–d, McCandless et al. 1973). Up to 25% of the carrageenan of gametophytic plants is soluble in KCl solutions and consists of the supposed precursor of -carrageenan, or mμ-carrageenan, and an unidentified carrageenan. An alkaline extraction such as is employed industrially will convert mμ- to -carrageenan, resulting in a product which is approximately 90% . The carrageenan isolated directly from tetrasporic *Chondrus* is λ with no other detectable carrageenan components.

EXAMPLE 5 (Table 6)

*Chondrus crispus* Stackhouse was collected from the intertidal zone at Chebogue Point, Yarmouth County, Morris Point, Halifax County, and from 3 – 4 m. depth near Toney River, Pictou County, in Nova Scotia. Only plants bearing mature sporangia were used in order to distinguish the tetrasporophytes from the female plants. The single male plant was a fertile third-generation specimen maintained in culture.

Whole carrageenan was fractionated with KCl either according to Smith et al. Arch. Biochem. Biophys. 53: 192-204. 1954, or by a modification of the leaching procedure of Stancioff and Stanley, Proc. Int. Seaweed Symp. 6: 595-609. 1969. The carrageenan was precipitated by adding the solutions to 2.5 volumes of 2-propanol. The samples were washed with 80% alcohol until chloride-free, and were dried.

The data (Table 6) shows that carrageenan from tetrasporophytes consisted almost entirely of KCl-soluble polysaccharide when fractionated according to Smith et al. (1954). The infrared spectra of this material, both deuterated and undeuterated, were indistinguishable from spectra of authentic λ-carrageenan (e.g. FIG. 2a–e, McCandless et al., 1973).

No -like fraction was recovered from KCl-treated extracts of *Chondrus crispus* tetrasporophytes, either before or after alkali modification of the carrageenan. In contrast to the tetrasporic plants, the bulk of the carrageenan from gametophytes was insoluble in KCl solution (Table 6). Sequential fractionation yielded a 0.15 M KCl-insoluble fraction, an intermediate fraction precipitating between 0.15 and 1.0 M KCl and a fraction soluble in 1.0 M KCl. The insoluble fraction was identified as -carrageenan by its sulfate and 3,6-anhydrogalactose contents (e.g., Table 2, McCandless et al., 1973), and an infrared spectrum indistinguishable from that of authentic -carrageenan, both deuterated and undeuterated. The spectrum of the intermediate fraction indicated that it was a mixture of -carrageenan and the 1.0 M KCl-soluble fraction (e.g. FIG. 2c,d,e, McCandless et al., 1973).

The chemical similarity of the carrageenans extracted from a given stage of *Chondrus* regardless of the time or place of its collection was striking. All female plants contained -carrageenan and soluble carrageenans other than λ-carrageenan. Extracts of these plants could not be distinguished from similar fractions from a male plant. On the other hand, when extracts of the tetrasporophyte stage were examined, only a λ-carrageenan was found.

These discoveries provide both a method for the production of λ- or -carrageenan, and an explanation for the observed variability in the traditional /λ ratios. Earlier workers did not separate the morphologically similar, but chemically different, sporophytic and gametophytic plants. Indeed it is remarkable that the sporophytes and gametophytes should retain such a close physical resemblance when their structural macromolecules, λ- or -carrageenan, exhibit very different viscosities, gelling properties and molecular structure after isolation from the plants.

For some purposes specific blends of the polysaccharides, different from the natural mixture, are desirable. By separate propagation of the different types of algae and separate recovery of the different polysaccharides, various specific blends can readily be produced from the products.

TABLE 1

*Chondrus crispus* from nature

| Date and location | Fresh wt gms | % Dry matter | Carrageenan content as % of fresh weight | | | /λ | Note |
|---|---|---|---|---|---|---|---|
| | | | Total | Kappa | Lambda | | |
| February Atlantic coast | 3.19 | 26.5 | 16.9 | 0.3 | 16.6 | 0.02 | Tetrasporic plants (empty sporangia) |
| | 3.54 | 26.8 | 15.0 | 11.1 | 3.9 | 2.9 | Female plants (carposporangia, some release of spores) |
| | 1.08 | 22.5 | 14.0 | 8.9 | 5.1 | 1.7 | Male plants |
| March Bay of Fundy | 2.11 | 29.4 | 15.3 | 2.2 | 13.1 | 0.17 | Tetrasporic plants |
| | 2.83 | 27.7 | 15.9 | 1.1 | 14.4 | 0.08 | Tetrasporic plants |
| | 3.60 | 25.1 | 14.6 | 10.2 | 4.4 | 2.32 | Female plants |

TABLE 2

*Chondrus crispus* from laboratory culture

| Fresh wt gms | % dry matter | Carrageenan content as % of fresh weight | | | /λ | Note |
|---|---|---|---|---|---|---|
| | | Total | Kappa | Lambda | | |
| Incubated at 15°, 16 h light period, intensity 300–600 ft-c | | | | | | |
| 0.78 | 28.0 | 11.6 | 8.7 | 2.9 | 2.9 | Female plants (with sori) |
| 0.93 | 27.9 | 13.8 | 9.2 | 4.6 | 2.0 | Male plants (with spormatia) |
| 1.39 | 28.9 | 13.6 | 1.5 | 12.1 | 0.12 | Tetrasporic plants (with sori) |
| Incubated at 13°, 10 h light period, intensity 300–600 ft-c | | | | | | |
| 1.08 | 21.8 | 11.2 | 9.0 | 2.2 | 4.1 | Female plants (with procarps; in culture 2½ yrs) |
| 0.74 | 23.8 | 12.6 | 1.0 | 11.6 | 0.09 | Tetrasporic plants (with sori) |
| 1.07 | 27.9 | 16.5 | 1.1 | 15.4 | 0.07 | Tetrasporic plants (sterile) |

TABLE 3

*Chondrus crispus* from laboratory culture

Tetrasporic plants incubated under various temperatures and photoperiods intensity 300–600 ft-c

| Fresh wt gms | % dry matter | Carrageenan content as % of fresh weight | | | /λ | Note |
|---|---|---|---|---|---|---|
| | | Total | Kappa | Lambda | | |
| 0.32 | 28.1 | 13.7 | 0.8 | 12.9 | 0.06 | 5°, 8:$\overline{16}$ h (plants fertile) |
| 0.94 | 23.1 | 11.6 | 0.7 | 10.9 | 0.06 | 5°, 8:$\overline{16}$ h (plants sterile) |
| 0.52 | 26.2 | 13.2 | 0.9 | 12.3 | 0.07 | 13°, 10:$\overline{14}$ h (plants fertile) |
| 0.46 | 29.3 | 16.5 | 0.9 | 15.6 | 0.06 | 13°, 10:$\overline{14}$ h (plants sterile) |
| 0.82 | 29.9 | 20.9 | 0.8 | 20.1 | 0.04 | 15°, 16:$\overline{8}$ h (plants fertile) |
| 0.37 | 32.4 | 19.6 | 1.0 | 18.6 | 0.05 | 15°, 16:$\overline{8}$ h (plants sterile) |

TABLE 4

*Chondrus crispus* from greenhouse culture

Initiated in laboratory culture and later transferred to greenhouse culture. Harvested for analyses in January.

| Fresh wt. gms | % dry matter | Carrageenan content as % of fresh weight | | | /λ | Note |
|---|---|---|---|---|---|---|
| | | Total | Kappa | Lambda | | |
| 3.14 | 23.5 | 12.1 | 9.3 | 2.8 | 3.3 | Female plants (fertile) |
| 2.41 | 22.9 | 10.1 | 8.0 | 2.1 | 3.8 | Male plants (fertile) |
| 3.40 | 22.2 | 10.7 | 8.3 | 2.4 | 3.4 | Gametophytic plants (sterile) |
| 3.81 | 22.8 | 10.9 | 1.4 | 9.5 | 0.15 | Tetrasporic plants (fertile) |
| 3.07 | 22.6 | 10.7 | 1.3 | 9.4 | 0.14 | Tetrasporic plants (sterile) |

TABLE 5

*Gigartina stellata* from nature and from culture

| Date and location | Fresh wt gms | % Dry matter | Carrageenan content as % of fresh weight | | | /λ | Note |
|---|---|---|---|---|---|---|---|
| | | | Total | Kappa | Lambda | | |
| March Sandy Cove (Hfx Co.) | 2.86 | 33.1 | 19.9 | 12.8 | 7.1 | 1.8 | Mature nemathecia |
| March Cape d'Or | 1.39 | 35.7 | 15.7 | 12.5 | 3.2 | 3.91 | Immature nemathecia |
| April Sandy Cove (Digby Co.) | 1.66 | 34.6 | 14.3 | 9.5 | 4.8 | 2.0 | Plants sterile |
| March culture | 1.12 | 35.9 | 17.8 | 11.1 | 6.7 | 1.66 | 13°, 10:14 h 600 ft-c mature nemathecia (discharging spores) |

TABLE 6

Data for *Chondrus crispus* carrageenan

| Plant sample | | Method | % of whole carrageenan | |
|---|---|---|---|---|
| | | | KCl soluble | KCl insoluble |
| 1. | F | a | 21.7 | 69.3 |
| 2. | F | a₁ | 16.6 | 85.6 |
| 3. | F | a₁ | 12.8 | nd |
| 4. | F | b | 10.2 (13.5) | 51.9 |
| 5. | M | c | 24.2 | 67.8 |
| 6. | T | a | 88.6 | 10.0 |
| 7a. | T | a | 83.3 | 15.8 |
| 7b. | T | c | 94.8 | 2.6 |
| 8. | T | c | 91.9 | 0 |

F=female; M=male; T=tetrasporic. Fractions prepared according to: a=Stancioff at 0.3 M KCl; a₁=Stancioff at 1.0 M KCl; b=Smith et al. sequentially treated at 0.15 and 1.0 M KCl. Data for the preparation soluble in 0.15 M, but insoluble in 1.0 M KCl are given in parantheses. The other value is for material soluble in 1.0 M KCl. c=Smith et al. using 0.3 M KCl. nd=not determined.

We claim:

1. A method for the production of specific polysaccharide from selected algal species producing the desired polysaccharide, comprising:
   a. providing vegetative parts or spores separated into
      i. gametophytes, or
      ii. tetrasporophytes,
   b. vegetatively propagating the segregated plant material,
   c. harvesting the plant growth, and
   d. recovering the desired polysaccharides from the harvested plants.

2. The method of claim 1 wherein the polysaccharides are carrageenans and the algal strains are marine algae known to produce carrageenans.

3. The method of claim 2 wherein the strains are selected from species of the following genera: Chondrus, and Gigartina.

4. The method of claim 3 wherein the species are *Chondrus crispus* or *Gigartina stellata*.

5. The method of claim 2 wherein gametophytes are vegetatively propagated and -carrageenan is recovered.

6. The method of claim 2 wherein tetrasporic algae are vegetatively propagated and λ-carrageenan is recovered.

7. The method of claim 1 wherein the vegetative propagation is carried out by:
   i. providing seawater at a temperature suitable for the growth of the algae, as growth medium,
   ii. maintaining the pH in said seawater between approximately pH 6.5 to 8.5 by $CO_2$ addition, and
   iii. maintaining the presence of assimilable nitrogen-source material to permit vigorous vegetative growth in the seawater system until shortly before harvesting.

8. The method of claim 7 wherein during a short period before harvesting no additional N-source material is supplied and the plant material is subject to strong illumination.

9. The method of claim 7 wherein fresh seawater is regularly supplied to the growth medium.

10. The method of claim 7 wherein the concentration of nitrogen-source material is maintained by continuously or intermittently supplying fixed nitrogen during the vigorous growth stage and then is allowed to become substantially exhausted for approximately 2 - 3 weeks before harvest.

11. The method of claim 10 wherein during said 2 - 3 week period the plants are subject to strong illumination sufficient to substantially decolorize the alga resulting in an improved polysaccharide material.

12. The method of claim 1 wherein different types of polysaccharides are recovered from (i) and (ii) in separate growth areas and blended to produce a desired polysaccharide mixture.

* * * * *

UNITED STATES PATENT OFFICE
CERTIFICATE OF CORRECTION

Patent No. 3,879,890  Dated April 29, 1975

Inventor(s) Lawrence C. M. Chen et al.

It is certified that error appears in the above-identified patent and that said Letters Patent are hereby corrected as shown below:

Insert the Greek symbol -- $\kappa$ --, for kappa at the following locations:

Column 1, lines 25 and 26;
   Column 2, line 9,
   Column 3, line 55,
   Column 4, lines 12, 27, 39, 41, 50, 52, 59 and 60;
   Column 5, lines 3, 7, 10, 11 and 40;
   Column 6, lines 8, 11, 13, 19, 26, 27 and 33;
   Table 1, to the heading of column 7;
   Table 2, to the heading of column 6;
   Table 3, to the heading of column 6;
   Table 4, to the heading of column 6;
   Table 5, to the heading of column 7;
   Column 10, line 22.

Signed and Sealed this third Day of February 1976

[SEAL]

Attest:

RUTH C. MASON  
Attesting Officer

C. MARSHALL DANN  
Commissioner of Patents and Trademarks